US012608170B2

(12) United States Patent
Ben Gigi et al.

(10) Patent No.: US 12,608,170 B2
(45) Date of Patent: Apr. 21, 2026

(54) INTERACTIVE AUDIO ENTERTAINMENT SYSTEM FOR VEHICLES

(71) Applicant: CERENCE OPERATING COMPANY, Burlington, MA (US)

(72) Inventors: Yitshak Lior Ben Gigi, Burlington, MA (US); Caitlin Vachon, Burlington, MA (US)

(73) Assignee: Cerence Operating Company, Bulington, MA (US)

( * ) Notice: Subject to any disclaimer, the term of this patent is extended or adjusted under 35 U.S.C. 154(b) by 211 days.

(21) Appl. No.: 18/546,885

(22) PCT Filed: Feb. 17, 2022

(86) PCT No.: PCT/US2022/016788
§ 371 (c)(1),
(2) Date: Aug. 17, 2023

(87) PCT Pub. No.: WO2022/178122
PCT Pub. Date: Aug. 25, 2022

(65) Prior Publication Data
US 2024/0126499 A1 Apr. 18, 2024

Related U.S. Application Data

(60) Provisional application No. 63/151,005, filed on Feb. 18, 2021.

(51) Int. Cl.
*G06F 3/16* (2006.01)
*B60K 35/10* (2024.01)
(Continued)

(52) U.S. Cl.
CPC .............. *G06F 3/165* (2013.01); *B60K 35/10* (2024.01); *B60K 35/26* (2024.01); *G10L 15/22* (2013.01);
(Continued)

(58) Field of Classification Search
CPC ......... G06F 3/165; B60K 35/10; B60K 35/26; B60K 2360/148; G10L 15/22; G10L 25/54; G10L 2015/223
See application file for complete search history.

(56) References Cited

U.S. PATENT DOCUMENTS 5,703,308 A * 12/1997 Tashiro .................. G10H 5/005
84/634
5,820,384 A * 10/1998 Tubman ............... G11B 27/028
434/156
(Continued)

FOREIGN PATENT DOCUMENTS

JP      H11167392 A   *  6/1999
JP      2004341338 A     12/2004
(Continued)

*Primary Examiner* — Brian L Albertalli
(74) *Attorney, Agent, or Firm* — Brooks Kushman, P.C.

(57) ABSTRACT

A system for interacting with an audio stream to obtain lyric information, control playback of the audio stream, and control aspects of the audio stream. In some instances, end users can request that the audio stream play with a lead vocal track or without a lead vocal track. Obtaining lyric information includes receiving via a text to speech module an audio playback of the lyric information.

10 Claims, 3 Drawing Sheets

(51) Int. Cl.
   B60K 35/26        (2024.01)
   G10L 15/22        (2006.01)
   G10L 25/54        (2013.01)
(52) U.S. Cl.
   CPC ........ G10L 25/54 (2013.01); B60K 2360/148
                 (2024.01); G10L 2015/223 (2013.01)

(56)                References Cited

U.S. PATENT DOCUMENTS

| | | | | |
|---|---|---|---|---|
| 11,245,950 | B1 * | 2/2022 | Mahar ..................... | G10L 15/26 |
| 2011/0273455 | A1 * | 11/2011 | Powar .................... | G11B 27/10 |
| | | | | 345/473 |
| 2012/0191461 | A1 * | 7/2012 | Lin ........................ | G06F 3/165 |
| | | | | 704/E21.001 |
| 2017/0372686 | A1 * | 12/2017 | Rajendran .............. | G10H 1/365 |
| 2018/0090116 | A1 * | 3/2018 | Zhao ....................... | G10L 25/48 |
| 2018/0190307 | A1 | 7/2018 | Hetherington et al. | |
| 2020/0402490 | A1 * | 12/2020 | Duthaler ................ | H04R 1/406 |
| 2022/0375470 | A1 * | 11/2022 | Pledl ....................... | H04R 3/00 |

FOREIGN PATENT DOCUMENTS

| | | | |
|---|---|---|---|
| JP | 2007047486 | A | 2/2007 |
| JP | 2008241761 | A * | 10/2008 |

* cited by examiner

INTERACTIVE AUDIO ENTERTAINMENT SYSTEM FOR VEHICLES

CROSS-REFERENCE TO RELATED APPLICATIONS

This application is the U.S. National Phase of PCT Application No. PCT/US2022/016788 filed on Feb. 17, 2022, which claims the benefit of U.S. provisional application Ser. No. 63/151,005 filed Feb. 18, 2021, the disclosures of which ae hereby incorporated in their entirety by reference herein.

TECHNICAL FIELD

Aspects of the disclosure generally relate to interactive audio entertainment applications for vehicles.

BACKGROUND

This invention relates to applications and, in particular, to entertainment applications in which a vehicle's processing system is an active participant. Passengers are often reluctant to undertake a long journey in an automobile. Although some of this reluctance arises from the risk of travel and from the physical discomfort of being seated for an extended period, a significant contributor is the anticipation of boredom.

Passengers have used a variety of ways to relieve the ennui of extended travel or travel in general. Reading books and, more recently, watching movies are both proven techniques for relieving boredom. Another method is to play games such as karaoke.

Audio-based entertainment has long been a form of entertaining automobile drivers and their passengers. Drivers listen to songs and sometimes sing along. It can become frustrating for drivers when they do not know the lyrics to a song. While passengers can look up lyrics to a song and sing along, drivers cannot safely do so.

Additionally, vehicle-based audio games and entertainment typically require all players to have access to the lyrics and the ability to control playback of the audio and navigate through the audio. One such game, karaoke, requires the ability to not only hear the lyrics, but also the ability to play the audio with and without song lyrics.

SUMMARY

Described herein are systems and methods for interacting with an audio stream, wherein the system includes an audio playback module that plays an audio stream in a first playback mode. A recognition module receives, from a head unit of a vehicle, one or more utterances comprising at least one command requesting lyric information associated with the audio stream. The audio playback module responds to the command within the utterance by identifying the lyric information. An entertainment interface within the system receives the lyric information from the audio playback module and outputs the lyric information to an end user.

The audio playback module plays audio stream through speakers of the vehicle.

The audio playback module identifies a time-bound section of the audio stream and searches for or identifies lyric information within that time-bound section. The time-bound section is characterized by a start time and a stop time. In some instances, the audio playback module identifies lyric information by recognizing speech uttered within the audio stream during the time-bound section. In other instances, the audio playback module identifies lyric information by finding lyrics that correspond to the time-bound section of the audio stream.

The system can comprise a text to speech module that generates synthetic speech from the lyric information. The entertainment interface can obtain the synthetic speech and output it to an end user to audibly relay to the end user the lyric information.

Described herein are systems and methods for interacting with an audio stream, where the system includes an audio playback module playing an audio stream in a first playback mode, and a recognition module. The recognition module receives, from a head unit of a vehicle, one or more utterances that include a command to play the audio stream in a second playback mode. The first playback mode can include playing both the instrumental and lead vocal tracks of the audio stream, the second playback mode can include playing just the instrumental track of the audio stream.

Described herein is a system for interactive audio entertainment that may include at least one loudspeaker configured to play back an audio stream in one or more modes into an environment, at least one microphone configured to receive microphone signals indicative of sound in the environment, and a processor programmed to instruct the loudspeaker to play back the audio stream in a first playback mode, receive a first microphone signal from the at least one microphone, the first microphone signal including a user utterance including a command to playback the audio stream in a second playback mode, instruct the loudspeakers to play back the audio stream in the second playback mode.

The first playback mode may include playing an audio stream comprising instrumental and lead vocal tracks. The second playback mode may include playing an audio stream comprising an instrumental track.

The processor may be further programmed to receive at least one other utterance including a command requesting lyric information associated with the audio stream and instructing output of the lyric information to the user, instruct the loudspeaker to output the lyric information, and/or identify a time-bound section of the audio stream and identifying lyric information within the time-bound section of the audio stream.

The time-bound section of the audio stream has a start time and a stop time, wherein identifying lyric information within the time-bound section of the audio stream comprises recognizing speech uttered between the start time and the stop time, and/or wherein identifying lyric information within the time-bound section of the audio stream comprises searching a database for lyric information uttered at a point in time between the start time and stop time of the time-bound section of the audio stream.

DETAILED DESCRIPTION

Disclosed herein is an audio processing system that allows users to engage with a voice control within the vehicle that allows for a dialog-based experience. In one example, an occupant of a vehicle may navigate song libraries, control audio streams (i.e., starting, stopping, rewinding, and fast forwarding the stream), issue utterances and other contextual information to dictate their intents and commands, receive a dialog-based tutorial of how to use the application to the users, among other features and functions. Specifically, the occupant may be able to request and receive the lyrics to for a specific segment of an audio stream.

Further, during playback of a requested audio stream, the audio processing system may continue to provide speech recognition, natural language understanding, text to speech, wake up word (WuW) detection, entertainment interfaces, smart assistant, and an interactive entertainment application. Thus, even with audio streaming, additional requests, intents, and commands may be processed and carried out.

For example, the occupant may utter "Play Satisfaction by Rolling Stones." The audio processing system within the vehicle may respond to the command and playback the appropriate audio stream. The user may then utter "get lyrics." The audio processing system may then implement various processes and modules to acquire the lyrics to the song of the audio stream. The lyrics may be presented via a synthesized speech generated by a text to speech engine and output by an entertainment interface.

The occupant may also select a mode for which to enjoy the audio stream. A first playback mode may include playing an audio stream comprising instrumental and lead vocal tracks and a second playback mode may include playing an audio stream with only the instrumental track.

Figure 1:
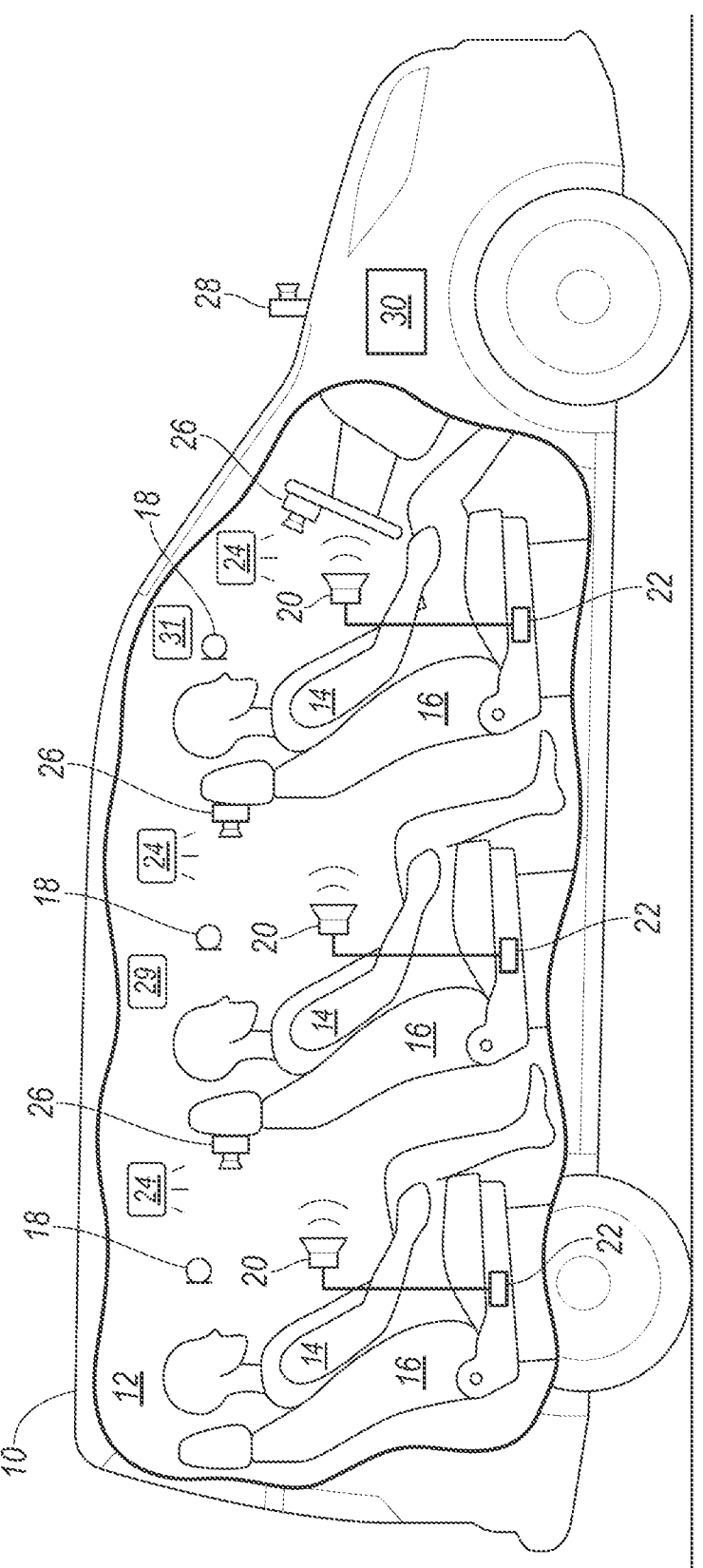
FIG. 1 shows a vehicle having an automotive processing-unit in communication with a variety of peripheral devices.

FIG. 1 illustrates a vehicle 10 having a passenger cabin 12 in which prospective entertainees 14 are seated in seats 16. Each seat 16 may have an associated microphone 18, a loudspeaker 20, and a haptic element 22. Within the cabin 12 are various feedback units 24 such as cabin lights or haptic units.

The vehicle 10 may include various types of passenger vehicles, such as crossover utility vehicle (CUV), sport utility vehicle (SUV), truck, recreational vehicle (RV), boat, plane or other mobile machine for transporting people or goods. Further, the vehicle 10 may be autonomous, partially autonomous, self-driving, driverless, or driver-assisted vehicles. The vehicle 10 may be an electric vehicle (EV), such as a battery electric vehicle (BEV), plug-in hybrid electric vehicle (PHEV), hybrid electric vehicle (HEVs), etc.

The vehicle 10 also includes internal cameras 26 and external cameras 28. The internal cameras 26 are directed towards various portions of the cabin 12. An internal camera 26 therefore often has an entertainee 14 in its field of view. The internal cameras 26 may be configured to provide for facial recognition of the occupant(s). The internal cameras 26 may also be configured to detect non-verbal cues as to the driver's behavior such as the direction of the user's gaze, user gestures, etc. The internal cameras 26 may monitor the entertaniees' head positions, as well as detect any other movement by the entertainee, such as a motion with the entertainees' arms or hands, shaking of the user's head, etc. The internal cameras 26 may provide imaging data taken of the entertainee to indicate certain movements made by the user. The internal cameras 26 may be a camera capable of taking still images, as well as video and detecting user head, eye, and body movement. The internal cameras 26 may include multiple cameras and the imaging data may be used for qualitative analysis. For example, the imaging data may be used to determine if the user is looking at a certain location or vehicle display. Additionally or alternatively, the imaging data may also supplement timing information as it relates to the user motions or gestures.

The external cameras 28 may directed towards the vehicle's environment and may capture the environment around the vehicle 10.

The vehicle 10 may include other sensors such as sensor in addition to the microphone 18, data provided by which may be used to aid in detecting occupancy, such as pressure sensors within the vehicle seats, door sensors, cameras etc. This occupant data from these sensors may be used in combination with the audio signals to determine the occupancy, including the number of occupants.

The feedback units 24 may be cabin lights 24 may be dome lights, light emitting diode strip lights, multicolor ambient lighting, etc. The lights 24 may be arranged in the center console, floors, dash, foot wells, ceiling, etc. In some examples, the lights 24 may adjust based on certain audio signals. For example, the light may be configured to flash, or change colors with the beat of music, specifically music provided by a karaoke application, which is described in more detail herein. The processor 30 may instruct such lighting changes in response to determining that an audio signal includes karaoke content, or voice/singing content from the user.

The feedback units may also be haptic unit 24 and may include inaesthetic communication or 3D touch affects that may create an experience of touch or motion by applying forces, or vibrations to the user. The haptic unit 24 may incorporate tactile sensors that measure forces exerted by the user on the interface. The haptic unit 24 may be arranged in the vehicle seats, displays, etc. In one example, the haptic unit 24 may be a button configured to provide haptic feedback when pressed.

In the system herein, the haptic unit 24 may be a button configured to engage or initiate voice control. The haptic unit 24 may include a unit arranged at each seat so that each entertainee or user may engage the voice control. This button may be specifically used to engage a karaoke application.

In some embodiments, the vehicle 10 includes a projector 29 and a pointer 31. These are used in connection with the execution of certain entertainment applications as described in U.S. patent application Ser. No. 17/111,868 filed on Dec. 4, 2020, the contents of which are hereby incorporated by reference in their entirety.

Figure 2:
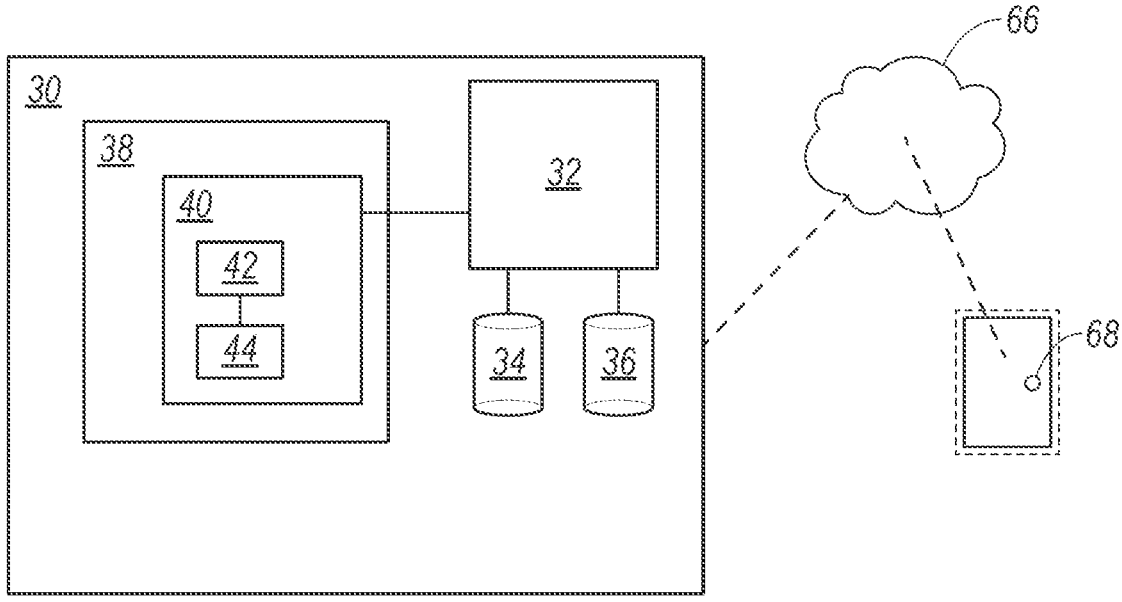
FIG. 2 shows components of a head unit in the automotive processing-unit of FIG. 1.

The vehicle 10 further includes an on-board automotive processing unit 30, details of which are further discussed in FIG. 2. The processing unit 30 may also be referred to herein as a head unit 30 or processor 30. Upon engagement of the haptic unit 24, voice control may be initiated and carried out by the processor 30. This may allow a user to navigate song libraries, control audio streams (i.e., starting, stopping, rewinding, and fast forwarding the stream), receive utterances and other contextual information to receive the intents and commands of the users, provide a dialog-based tutorial of how to use the application to the users, among other features and functions. Specifically, a user may be able to request and receive the lyrics to for a specific segment of an audio stream. The lyrics may be presented via a synthesized speech generated by a text to speech engine and output by an entertainment interface.

Further, while an automotive system is discussed in detail here, other applications may be appreciated. For example, similar functionally may also be applied to other, non-automotive cases, e.g., for augmented reality or virtual reality cases with smart glasses, phones, eye trackers in living environment, etc. While the terms "user" is used throughout, this term may be interchangeable with others such as speaker, occupant, entertainee, etc.

Referring now to FIG. 2, the automotive-processing unit 30 features an on-board navigation system 32 that receives satellite signals, processes them to output spatial coordinates, and displays a representation of the vehicle's spatial environment on a map selected from a map database 34. In addition, the on-board navigation system 30 has access to a feature database 36 that provides information concerning points-of-interest corresponding to various spatial coordinates.

The automotive-processing unit 30, or processor 30, also includes an infotainment system 38 that includes a head unit 40 having a processor 42 and a memory 44. The infotainment system 38 interfaces with a peripheral-device set that includes one or more peripheral devices. Examples of peripheral devices include one or more of: the microphones 18, the loudspeakers 20, the haptic elements 22, the cabin lights 24, the cameras 26, 28, the projector 29 and the pointer 31.

The microphone 18 may be configured receive audio signals from within the vehicle cabin, such as acoustic utterances including spoken words, phrases, or commands from a user. The microphone 18 may also be configured to receive other acoustic sounds such as singing, tapping, knocking, signing, etc. This may be part of a karaoke system. The microphone 18 may also include an audio input configured to provide audio signal processing features, including amplification, conversions, data processing, etc., to the processor 30. While the microphone 18 is described herein as being used for purposes of the processing system and karaoke system, the microphone 18 may be used for other vehicle features such as active noise cancelation, hands-free interfaces, etc. The microphone 18 may facilitate speech recognition from audio received via the microphone 18 according to grammar associated with available commands, and voice prompt generation.

As explained, various commands may be received from the user and these may include playback commands with respect to the audio stream. These may include the instruction to play a certain song or artist, to practice a song, play, pause, stop, fast forward, rewind, read lyrics, etc.

The vehicle 10 may include an audio system having audio playback functionality through vehicle loudspeakers 20 or headphones. The audio playback may include audio from sources such as a vehicle radio, including satellite radio, decoded amplitude modulated (AM) or frequency modulated (FM) radio signals, and audio signals from compact disc (CD) or digital versatile disk (DVD) audio playback, streamed audio from a mobile device, commands from a navigation system, etc. The loudspeakers 20 may also play music for the karaoke system and provide lyric information to the user.

The vehicle 10 may be configured to include various types of components, processors, including automotive-processing unit 30, and memory, and may communicate with a communication network 66. The communication network 66 may be referred to as a "cloud" and may involve data transfer via wide area and/or local area networks, such as the Internet, Global Positioning System (GPS), cellular networks, Wi-Fi, Bluetooth, etc. The communication network 66 may provide for communication between the vehicle 10 and an external or remote server 68 and/or database, as well as other external applications, systems, vehicles, etc. This communication network 66 may provide navigation, music or other audio, program content, marketing content, internet access, speech recognition, cognitive computing, artificial intelligence, to the vehicle 10.

In one example, the communication network 66 may allow for vehicle-to-vehicle communication.

The processor 30 may instruct loudspeakers 20 to playback various audio streams, and specific configurations. For example, an entertainee may request that the playback be of a specific song with only the instrumental track being played. Other options include additionally also including the lead vocals track in the playback. In another option, the playback may include the instrumental track. These play back modes are discussed in more detail herein.

The remote server 68 and the database may include one or more computer hardware processors coupled to one or more computer storage devices for performing steps of one or more methods as described herein and may enable the vehicle 10 to communicate and exchange information and data with systems and subsystems external to the vehicle 10 and local to or onboard the vehicle 10. The vehicle 10 may include one or more processors 30 configured to perform certain instructions, commands and other routines as described herein. Internal vehicle networks may also be included, such as a vehicle controller area network (CAN), an Ethernet network, and a media oriented system transfer (MOST), etc. The internal vehicle networks may allow the processor 30 to communicate with other vehicle 10 systems, such as a vehicle modem, a GPS module and/or Global System for Mobile Communication (GSM) module configured to provide current vehicle location and heading information, and various vehicle electronic control units (ECUs) configured to corporate with the processor 30.

The processor 30 may execute instructions for certain vehicle applications, including navigation, infotainment, climate control, etc. Instructions for the respective vehicle systems may be maintained in a non-volatile manner using a variety of types of computer-readable storage medium. The computer-readable storage medium (also referred to herein as memory 44 or storage) includes any non-transitory medium (e.g., a tangible medium) that participates in providing instructions or other data that may be read by the processor 30. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/structured query language (SQL).

In some embodiments, the processing system or processor 30 provides input/output control functions with respect to one or more electronic devices, such as a heads-up-display (HUD), vehicle display, and/or mobile device of the driver or passenger, sensors, cameras, etc. The vehicle 10 may include a wireless transceiver, such as a BLUETOOTH module, a ZIGBEE transceiver, a Wi-Fi transceiver, an IrDA transceiver, a radio frequency identification (RFID) transceiver, etc.) configured to communicate with compatible wireless transceivers of various user devices, as well as with the communication network 66.

The vehicle 10 may include other sensors, data provided by which may be used to aid in detecting occupancy, such as pressure sensors within the vehicle seats, door sensors, cameras etc. This occupant data from these sensors may be used in combination with the audio signals to determine the occupancy, including the number of occupants.

Figure 3:
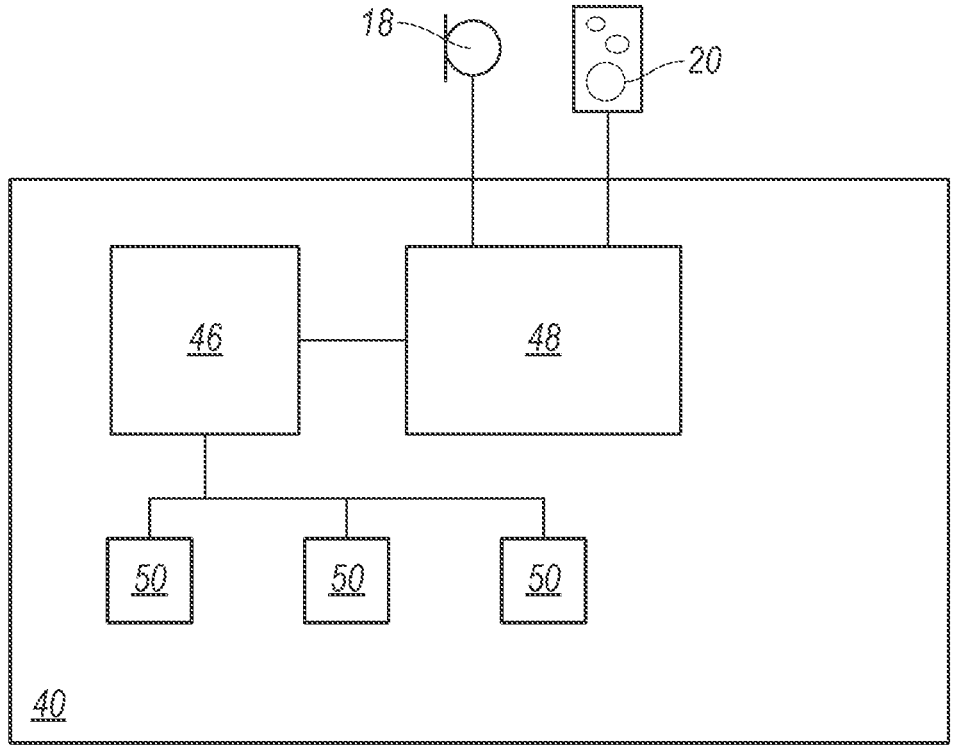
FIG. 3 shows the architecture of a head unit in the automotive processing-unit shown in FIG. 1 that functions independently of any connection to a remote server, for example via the cloud.

Referring now to FIG. 3, an automotive assistant 46 executing in the head unit 40 functions as the head unit's operating system. The automotive assistant thus enables the head unit 30 to execute various applications, among which is a speech interface 48 and one or more entertainment applications 50, 52, 54. The illustrated embodiment features spatially-cognizant entertainment applications 50, interactive audio entertainment system 52, and other vehicle entertainment systems 54.

Examples of a spatially-cognizant entertainment application 50 includes games in which the vehicle 10 acts as one player. Such games can be played by one person or by two or more persons. Other examples of entertainment applications include those that generate a virtual world or experience, educational applications, or similar applications that entertain an entertainee to distract the entertainee from the boredom of an extended drive. Each such spatially-cognizant entertainment application exploits the spatial intelligence that arises from information gleaned from the various peripheral devices that are connected to the infotainment system 38.

A first entertainment application 50 implements a feature-identification game that relies on spatial intelligence to either pose or accept challenges concerning the existence of various features or points-of-interest in the vehicle's environment and sensory feedback to infer the entertainee's intent. This environment includes both the cabin's interior and its exterior. Examples of such features or points-of-interests include buildings, monuments, landmarks, and geographic features such as bodies of water, whether still or flowing, including lakes, rivers, and waterfalls, and areas of noticeable gradient, whether positive or negative, on the landscape, such as hills, cliffs, escarpments, and buttes. Features and points-of-interest can also include transient features such as another vehicle on the road or parked. The external cameras 28 may provide images of the vehicle's environment for the feature-identification game.

The feature-identification game is played by first and second players, one of which is a human player, i.e., the entertainee, and the other of which is a non-human player that is implemented by the first entertainment application 50 itself.

It is therefore apparent that the term "player" does not necessarily mean a human being. In addition, the term "player" is a logical construct that is not restricted to one human being but can represent a set of human beings that cooperate to function as a "player." Thus, one can regard a "player" as a "playing entity."

In the context of the games described herein, it is possible for the entertainee and the automotive assistant to switch roles. To promote compactness of expression, the logical terms "first player" and "second player" will be used with the understanding that the entertainee and the automotive assistant can switch roles.

The first player selects the feature. The second player attempts to guess, based on one or more hints or clues, the particular features that the first player selected.

Examples of an interactive audio entertainment system 52 are karaoke applications that allow users to sing along with lyricized music that is modified to remove the lead vocal audio track. Other interactive audio entertainment systems

52 allow users to interact with, modify, and navigate audio streams. In some instances, the interactive audio entertainment system 52 can be configured to permit vehicle drivers to access song lyrics, interact with an audio stream, and control song playback in a safe manner. That is, while the vehicle 10 may be capable of displaying textual lyrics on a display screen, e.g., text to screen (TTS), the vehicle 10 may also implement a tactile interface (UX), as well as voice commands and dialog to provide feedback and lyrics to the user.

The interactive audio entertainment system 52 can include an audio playback module, a recognition module, an entertainment interface, and a text to speech module or engine. While the modules are illustrated herein as being distinct, each may be part of a processor or controller configured to carry out the processes and methods described herein. For example, head unit 30, processor 30, etc., may include each or one or more of the modules and their various functions.

The audio playback module can receive and respond to user commands and requests as well as play an audio stream in various modes. One playback mode includes playing both the instrumental and lead vocal tracks of an audio stream. A second playback mode includes playing just the instrumental track of an audio stream. A third playback mode includes playing the instrumental track and a track of the end user's recorded lead vocals. The audio stream is characterized by time periods defined in relation to the beginning of the audio stream and the end of the audio stream. The audio stream starts at the beginning of a song or audio track and ends at the end of a song or audio track. Time periods in between the beginning and end of the audio stream are described according to how much time has passed since the beginning of the track. For example, a time period that starts at 1 minute and ends at 2 minutes starts at a point in time 1 minute after the beginning of the audio stream and ends at a point in time 2 minutes after the beginning of the audio stream. This time-bound section of audio is 1 minute long.

When a user wants to obtain lyric information, or song lyrics, for a section of a song, the user can utter a command to the head unit. This command can have an inherent intent that directs the audio playback module to find lyrics of a time-bound section of the audio stream. For example, if an end user asks the audio playback module at 1 minute thirty seconds into a song to provide lyrics, the audio playback module can obtain lyric information corresponding to the time-bound section of audio starting at the beginning of the song and ending 1 minute and thirty seconds after the start of the song.

Lyric information can be obtained either by querying a database for lyric information, or by recognizing speech uttered during the audio stream. Lyrics can be safely and audibly output to end users by first converting the lyric information to synthetic speech and then outputting the synthetic speech. The text to speech module or engine can be used to generate the synthetic speech. In some examples the lyrics may also be presented textually via the display.

Figure 4:
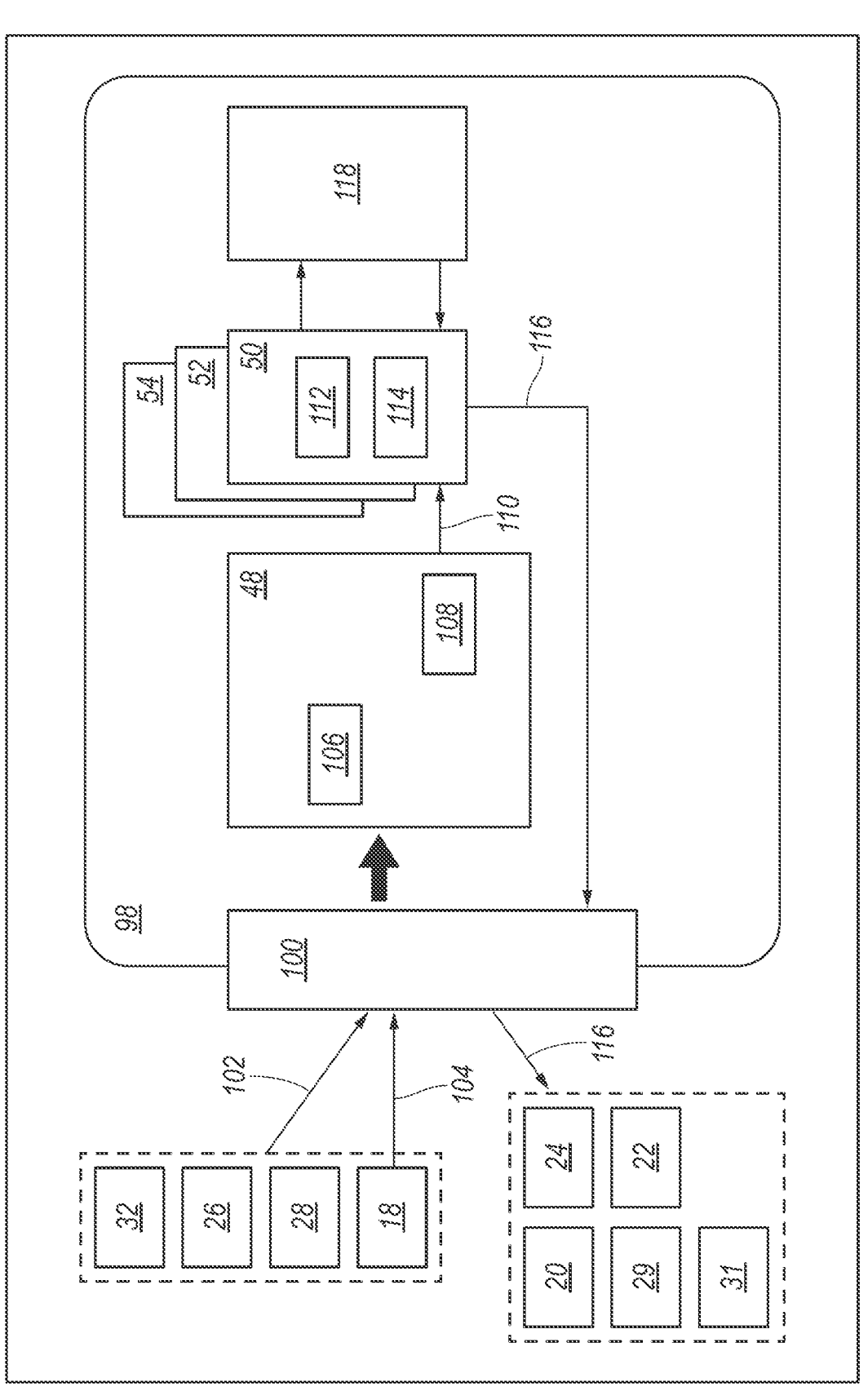
FIG. 4 shows the architecture of an alternative embodiment of a head unit in the automotive processing-unit shown in FIG. 1 that, unlike the embodiment shown in FIG. 3, which functions independently of any connection to a remote server, for example via the cloud, does not function independently of any remote server and in fact maintains a connection to remote server, for example via, the cloud, during operation thereof.

The architecture shown in FIG. 4 provides a cloud interface 100, similar to communication network 66 of FIG. 2, that receives sensor data 102 and speech data 104 and provides them both to the remote computer 98, such as, in one example, the remote server 68 of FIG. 2. The sensor data 102 comes from the internal and external cameras 26, 28 and from the on-board navigation system 32. The speech data 104 comes from the microphone 18.

The speech interface 48, which may be implemented on the remote computer 98, includes an automatic speech-recognition module 106 and a natural-language understanding module 108. The automatic speech-recognition module 106 identifies semantic units, such as words and phrases, in a stream of sound, that may be received by microphone 18. The natural-language understanding unit 108 maps the identified semantic units into meanings. For example, in those embodiments in which the entertainment application implements a game, the speech interface 48 provides a selected game with application input 110 that includes the sensor data 102 and the speech data 104.

The entertainment applications include application logic 112 that use the application input 110 to execute the entertainment applications 50, 52, 54. This results in an entertainment status. A feedback generator 114 that provides feedback information 116 on the entertainment status. The feedback generator 114 typically includes a natural-language generator that outputs either text or speech based on text. The feedback information 116 includes text and/or speech and, when appropriate, information concerning a point-of-interest. This feedback information is then transmitted back to the vehicle 10 for communication to the entertainee via one or more modes of communication, such as a loudspeaker 20, a haptic element 22, cabin lights 24, the pointer 31, and/or the projector 29. In some embodiments, the projector 29 is a virtual-reality projector that projects images. A display may also be used to display certain visual effects.

The remote computer 98 further maintains a spatial-intelligence module 118 that includes information concerning points-of-interest. Based on location data provided by the navigation system 32 of FIG. 2, the spatial-intelligence module 118 provides information concerning points-of-interest that may be relevant to the spatially-cognizant entertainment application 50. Such information forms part of the feedback information 116.

It is to be understood that the foregoing description is intended to illustrate and not to limit the scope of the invention, which is defined by the scope of the appended claims. Other embodiments are within the scope of the following claims.

While examples are described herein, other vehicle systems may be included and contemplated. Although not specifically shown, the vehicle may include on-board automotive processing units that may include an infotainment system that includes a head unit and a processor and a memory. The infotainment system may interface with a peripheral-device set that includes one or more peripheral devices, such as microphones, loudspeakers, the haptic elements, cabin lights, cameras, the projector and pointer, etc. The head unit may execute various applications such as a speech interface and other entertainment applications, such as a karaoke application. Other processing include text to speech, a recognition module, etc. These systems and modules may respond to user commands and requests.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for interacting with an audio stream, the system comprising:
    an audio playback module playing an audio stream in a first playback mode; and
    a recognition module receiving, from a head unit of a vehicle, one or more utterances comprising at least one command requesting that the audio playback module play the audio stream in a second playback mode,
    wherein the audio playback module responsively plays the audio stream in the second playback mode
    wherein the recognition module receives a second microphone signal from the head unit, the second microphone signal including another user utterance including a second command requesting lyric information associated with the audio stream, and instructs the audio playback module to output the lyric information.

2. The system of claim 1, wherein the first playback mode comprises playing instrumental and lead vocal tracks of the audio stream.

3. The system of claim 1, wherein the second playback mode comprises playing an instrumental track but not lead vocal tracks of the audio stream.

4. A system for interactive audio entertainment, comprising:
    at least one loudspeaker configured to play back an audio stream in one or more modes into an environment;
    at least one microphone configured to receive microphone signals indicative of sound in the environment; and
    a processor programmed to
        instruct the loudspeaker to play back the audio stream in a first playback mode,
        receive a first microphone signal from the at least one microphone, the first microphone signal including a user utterance including a command to play back the audio stream in a second playback mode,
        instruct the at least one loudspeaker to play back the audio stream in the second playback mode,
        receive a second microphone signal from the at least one microphone, the second microphone signal including another user utterance including a second command requesting lyric information associated with the audio stream, and
        instruct the at least one loudspeaker to output the lyric information.

5. The system of claim 4, wherein the first playback mode comprises playing instrumental and lead vocal tracks of the audio stream.

6. The system of claim 4, wherein the second playback mode comprises playing an instrumental track but not lead vocal tracks of the audio stream.

7. The system of claim 4, wherein the processor is further programmed to identify a time-bound section of the audio stream and identify the lyric information within the time-bound section of the audio stream.

8. The system of claim 7, wherein the time-bound section of the audio stream has a start time and a stop time.

9. The system of claim 8, wherein the processor is further programmed to identify the lyric information within the time-bound section of the audio stream by recognizing speech uttered between the start time and the stop time.

10. The system of claim 8, wherein the processor is further programmed to identify the lyric information within the time-bound section of the audio stream by searching a database for the lyric information uttered at a point in time between the start time and the stop time of the time-bound section of the audio stream.

\* \* \* \* \*